United States Patent [19]
Beasley et al.

[11] Patent Number: 5,450,370
[45] Date of Patent: Sep. 12, 1995

[54] QUALITY ASSURANCE OF SPATIAL SAMPLING FOR DMO

[75] Inventors: Craig J. Beasley; Ricky L. Workman, both of Houston, Tex.

[73] Assignee: Western Atlas International, Inc.

[21] Appl. No.: 69,565

[22] Filed: May 28, 1993

[51] Int. Cl.⁶ .......................... G01V 1/36; G01V 1/20
[52] U.S. Cl. ........................................ 367/53; 367/73; 364/421
[58] Field of Search ........................ 367/21, 22, 53, 56, 367/58, 62, 73; 364/421

[56] References Cited

U.S. PATENT DOCUMENTS

| | | | |
|---|---|---|---|
| 4,742,497 | 5/1988 | Beasley et al. | 367/52 |
| 4,797,861 | 1/1989 | Beasley | 367/52 |
| 4,866,659 | 9/1989 | Lin et al. | 364/421 |
| 4,878,204 | 10/1989 | Black et al. | 367/53 |
| 4,878,205 | 10/1989 | Gelchinsky | 367/53 |
| 4,953,142 | 8/1990 | Rimmer | 367/73 |
| 4,974,212 | 11/1990 | Sheiman | 367/21 |
| 5,150,332 | 9/1992 | Bale et al. | 367/73 |
| 5,206,837 | 4/1993 | Beasley et al. | 367/59 |
| 5,233,569 | 8/1993 | Beasley et al. | 367/53 |
| 5,285,422 | 2/1994 | Gonzalez et al. | 367/53 |
| 5,309,406 | 5/1994 | Ongkiehong et al. | 367/73 |

OTHER PUBLICATIONS

Beasley et al, 54th EAEG Mtg. Abst. pp. 232–233, Jun. 5, 1992; Abst. provided herewith.
Beasley et al, 62nd SEG Int. Mtg. Abst. pp. 970–973, Oct. 29, 1992; Abst. provided herewith.
Rodriquz et al, 61st SEG Int. Mtg, V2, pp. 1301–1304, Nov. 14, 1991; Abst. only herewith.

*Primary Examiner*—Nelson Moskowitz
*Attorney, Agent, or Firm*—William A. Knox

[57] ABSTRACT

This invention provides a method for examining the geometry of the disposition of a plurality of sources and receivers over an area to be surveyed with a view to optimizing the array to avoid data shadow zones and to optimize the resulting seismic image. The method depends upon studying the statistical distribution of dip polarity in dip bins along selected CMP azimuths.

6 Claims, 8 Drawing Sheets

QUALITY ASSURANCE OF SPATIAL SAMPLING FOR DMO

BACKGROUND OF THE INVENTION

1. Field of the Invention

This invention relates generally to seismic data processing and more particularly to a method for optimizing the spatial geometry of a seismic data-acquisition array to insure adequate data sampling and to avoid singularities.

2. Discussion of the prior Art

In the art of seismic exploration, an acoustic wavefield (a shot) is generated by an acoustic source. The wavefield propagates through the earth from a source location. The wavefield is reflected from earth layers beneath the surface whence it returns to the surface. A plurality of seismic detectors are distributed on or near the surface of the earth, remotely from the source location, along lines of survey or in large areal patches. Preferably, the detectors, which constitute discrete wavefield sampling stations, are uniformly distributed spatially so that the wavefield can be uniformly sampled both areally and temporally. The sampled data are quantized and archivally recorded for further processing.

With respect to seismic exploration in general, the ideal uniform distribution is sometimes not possible because of obstructions such as buildings, roads or other culture. In the case of marine exploration, the distribution is irregular because of errors in the assumed detector locations due to cable drift because of currents and wind or due to the presence of drilling and production platforms. The seismic data are often not only locally under-sampled, they also may be locally excessively densely sampled.

Well-known seismic dam-processing algorithms such as stacking, multi-channel filtering, dip moveout correction (DMO), prestack migration, velocity analyses, anisotropy studies, migration and wavefield extrapolation, all assume that the data are uniformly sampled. However, in operation, as has been explained, the data gathered may be irregularly sampled whether because of obstructions or to missing shots or to inoperative detectors or receivers. When such irregular or inadequately spatially sampled data are not corrected, unwanted computational artifacts may result that are superimposed upon the processed output data. Optimum computational results often can be obtained with proper design of the array geometry, that is, by optimizing the distribution of the seismic sources and receivers to minimize or eliminate singularities in the data.

U.S. Pat. No. 5,206,837, issued Apr. 27, 1993 to C. Beasley et al. and assigned to the assignee of this disclosure, addresses a method for compensating for the effects of irregular spatial sampling of seismic wavefields and is incorporated herein by reference. One of the purposes of that method is to spline or interpolate across regions of sparse data.

M. S. Egan et al. in a paper published in *The Leading Edge*, v. 11, p. 37, 1991 entitled "Shooting Direction for 3-D Marine Data", points out that the direction of progress down a seismic line has an effect on the resolution of positive versus negative dips. Although they recognize the problem, they do not propose a solution.

In this disclosure, the term "operator" will be used frequently. The term is defined to mean a specific thing involved in a data-processing operation. Thus a DMO operator is a specific expression involved in applying a correction to normal moveout for dip. An operator may be expressed as a symbol indicating an operation to be performed and itself may be the subject of mathematical manipulation.

There is a need for a method for examining the proposed geometry of a seismic survey for the purpose of detecting, in particular, shadow zones and in general, finding over- or under-sampled data zones and for providing guidelines for avoiding creation of such zones ab initio by reconfiguring the array geometry.

SUMMARY OF THE INVENTION

An array geometry is selected for the conduct of a seismic survey over an area of interest. A wavefield is assumed to be propagated from a source location. The wavefield is spatially sampled at a plurality of discrete data-sampling stations that are distributed over an area that is remote from the source location. The wavefield samples are combined into a raw gather to which a selected equalized DMO processing operator is applied to provide a processed gather along a selected azimuth. For every x along a preselected direction, over the range between h and -h (h being one-half the source-receiver offset), the dips are sampled and binned to form dip weight tables on the parameter $$q = x/h$$

where $$-1 \leq q \leq +1.$$

The binned dip weight distribution statistics are examined for singularities as represented by a skew towards a preferential dip direction. Skew is minimized by iteratively perturbing the initial array geometry and re-examining the dip weight distribution.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
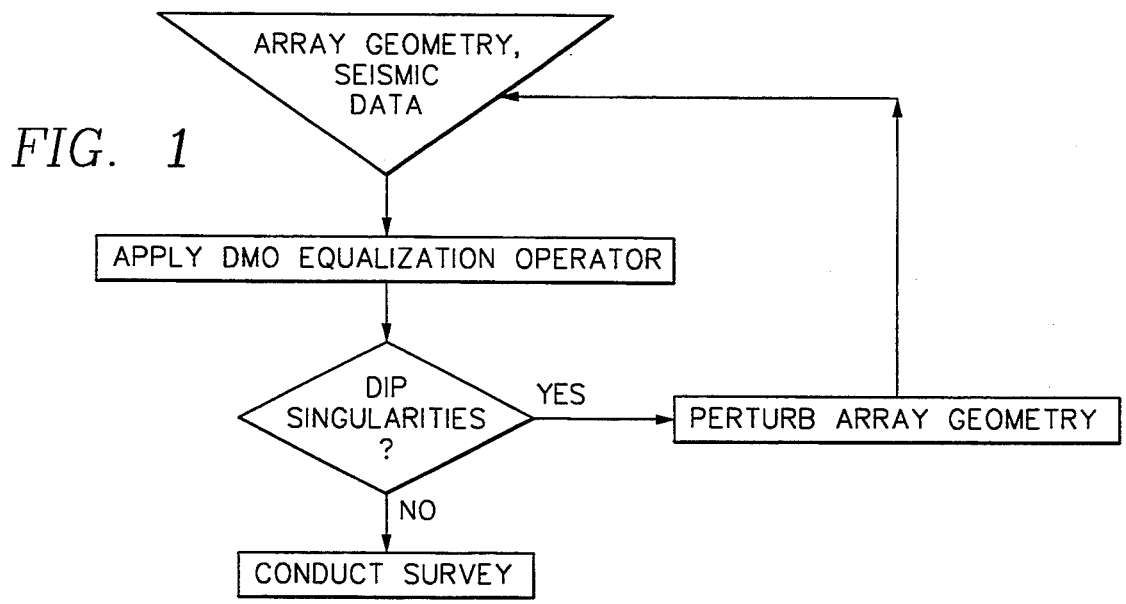
FIG. 1 is a simplified flow diagram of the process of this invention.

For the purpose of clarity and explanation, the method of this invention will be described by way of example, but not by way of limitation, with respect to DMO processing of seismic wavefields. It is to be clearly understood that the preferred method may be applied to any multichannel data processing regime such as anisotropy studies, filtering operators, migration and wavefield extrapolation as earlier mentioned. Although the method will be explained by reference to a marine seismic survey, it is to be understood that the method applies also to land operations on earth and anywhere in the universe.

Repeated reference has been and will be made to Dip Moveout correction or DMO. The DMO operator can be decomposed into two simple processes: A dip-dependent normal moveout correction followed by a dip filter. The full DMO operator is formed by summing the results over all possible dips. See for example, U.S. Pat. No. 4,742,497, issued May 3, 1988, to Craig Beasley et al. At each output station and time, the DMO-corrected wavefield then decomposes into a sum of dip components contributed from the input data. Applying DMO to regularly-sampled data will create at each spatial location a complete and balanced distribution of dip components, which interfere constructively or destructively to form the DMO-corrected wavefield. On the other hand, irregularly sampled data results, after DMO, in a lack of dip components at some spatial and temporal locations or an over-abundance of dip components at other spatial and temporal locations. That imbalance in the dip components that form the DMO-corrected wavefield hinders the process of constructive and destructive interference. A solution to this problem lies in analyzing the imbalances and normalizing to correct said problem.

In this process, there is first tabulated for each output time, azimuth, location and dip, the number of traces that have contributed to that dip component. Then, just as a stack is normalized by dividing the summed data by a function of the time- and mid-point-varying multiplicity, each dip component is individually normalized by applying the inverse of the number of live dip contributions from the input wavefield samples. In effect that process is a type of scaling of a selected attribute, such as amplitude, of the dip components.

Assuming a constant source-location to sampling-station azimuth, the preferred method can be formalized by the following analysis which can be easily extended to the case of varying azimuth by adding a summation over azimuth.

For uniformly sampled data, the zero-offset wavefield $P_o$ obtained from applying DMO and stack can be represented as $$P_o = \frac{1}{n} \sum_{h=1}^{n} D_h P \qquad (1)$$

where P is the normal-move, out corrected pre-stack data uniformly sampled within each offset, h is an index denoting offset and the $D_h$ are the familiar common-offset DMO operators. In this notation, $D_h$ operates on the entire input wavefield but is zero except for data within the offset group h. With this notation, we can drop the input and output wavefields and write the combined DMO and stack operator S as $$S = \frac{1}{n} \sum_{h=1}^{n} D_h \qquad (2)$$

For seismic data with irregular sampling, traces within offset groups are either missing or perhaps replicated. The configuration of the sampling stations forms a de facto acquisition filter that acts on the sampled wavefield in a manner analogous to the filtering effect of the earth. We can represent that effect as a sampling operator $A_h$ that is applied prior to DMO, to the regularly sampled data. The DMO and stack operator actually applied is then given by $$\widetilde{S} = \frac{1}{n} \sum_{h=1}^{n} D_h A_h \qquad (3)$$

Now we write the DMO operator in equation (3) in discrete form as the sum of its dip components:

$$\widetilde{S} = \frac{1}{n} \sum_{h=1}^{n} \sum_{d} F_d N_{d,h} A_h \qquad (4)$$

$N_{d,h}$ is a dip-dependent normal moveout correction and $F_d$ is a dip filter that passes a range of dips surrounding dip d. By reversing the order of summation and factoring out the dip filter, (4) can be written as $$\widetilde{S} = \frac{1}{n} \sum_{d} F_d \left( \sum_{h=1}^{n} N_{d,h} A_h \right) \qquad (5)$$

To correct for the sampling effects introduced by the operator $A_h$, we introduce the dip-dependent operator $H_d$ into the process and obtain $$S = \frac{1}{n} \sum_{d} D_d H_d \left( \sum_{h=1}^{n} N_{d,h} A_h \right) \qquad (6)$$

where $$H_d = \left( \sum_{h=1}^{n} N_{d,h} \right) \left( \sum_{h=1}^{n} N_{d,h} A_h \right)^{-1} \qquad (7)$$

Equation 7 provides the DMO equalization operator. When $A_h$ is the identity function, the process is simply conventional DMO that would be applied in the presence of uniform spatial sampling. As long as the equalization operator given by (7) exists, the DMO equalization process applied to irregularly sampled data is theoretically equivalent to conventional DMO applied to uniformly-sampled data. In effect, the equalization operator provides a means for performing an informed splining of phantom components between operators across a sparsely-sampled data gap by borrowing properly-sampled adjacent dip segments. In Equation (7), the splining operation is performed across the h axis, that is, the source to receiver offset but could also be performed across other spatial and temporal axes.

FIG. 1 shows a flow diagram for optimizing the proposed geometry of a seismic array. The input parameters for the proposed configuration are entered into the analysis routine along with simulated dip information with respect to a particular azimuth, such as in-line with the direction of survey. A wavefield propagates from a source location to the respective receiver stations which represent discrete data sampling stations. The wavefield is spatially sampled at the respective stations to form a raw CMP (common mid point) gathers. The DMO equalization operator is applied to the raw data samples to form a processed gather along the desired azimuth. The resulting data are examined for singularities, that is, for null values. If there are none, the survey is conducted as proposed; if problems are forecast, the configuration of the survey layout is perturbed and the process is iteratively repeated. It is the singularity analysis that will now be explained.

For every CMP location x, along the desired azimuth, over the range of h and -h, h being one-half the source-receiver offset, the dips are uniformly sampled and binned to form dip weight tables. For the selected azimuth, each bin represents the DMO fold or multiplicity at a position x within the DMO aperture.

For some statistical measures, each non-empty bin is treated as a sample point. For example, the average dip weight is the mean of the non-zero samples. The standard deviation is the sample standard deviation for the non zero samples. Separate statistics are computed for positive and negative dips in each direction. A positive dip is dip along the inline direction. The average and standard deviation are computed over the dip bins from all offsets and each azimuth direction.

Two particularly useful statistics are the skew and the standard deviation. Skew is an indication of a trend towards a particular dip. Another quantity of interest is the percent of non-empty positive and negative dip bins in each direction. Ideally, there should be no skew and both positive and negative dips should be equally well distributed in all directions. A dearth of dips of one or the other polarity is cause for perturbation of the geometry to obtain better, more equalized dip response.

Figure 2:
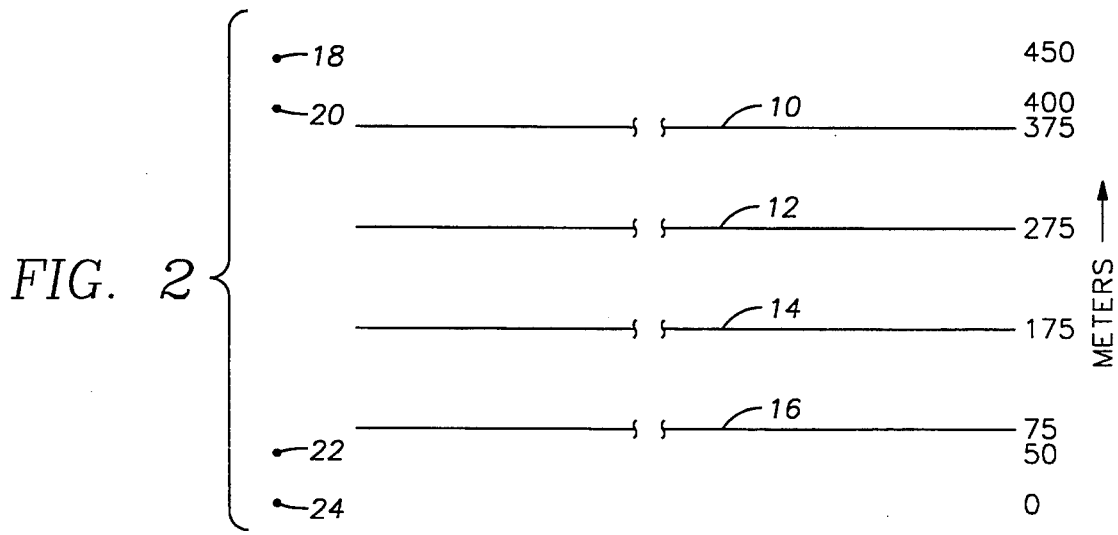
FIG. 2 is an initial source and receiver array configuration with the sources outboard of the receiver strings, the four sources and four receiver strings are independent and are capable of generating 16 subsurface CMP lines.

FIG. 2 represents a generic wide tow dual ship geometry for a typical marine survey. Four streamer cables 10-16 of conventional design, each supporting a plurality of sampling stations or receivers, are towed behind a ship (not shown) in a direction from right to left. Four acoustic sources 18-24 are towed behind the ship outboard of the streamer cables 10-16 using the spacings (in meters) shown. It can be demonstrated that, by firing each of the sources sequentially, a swath of 16 CMP lines is created. CMP lines 1 and 16 are the outermost lines of the swath while lines 8 and 9 lie at the center of the swath.

Figure 3:
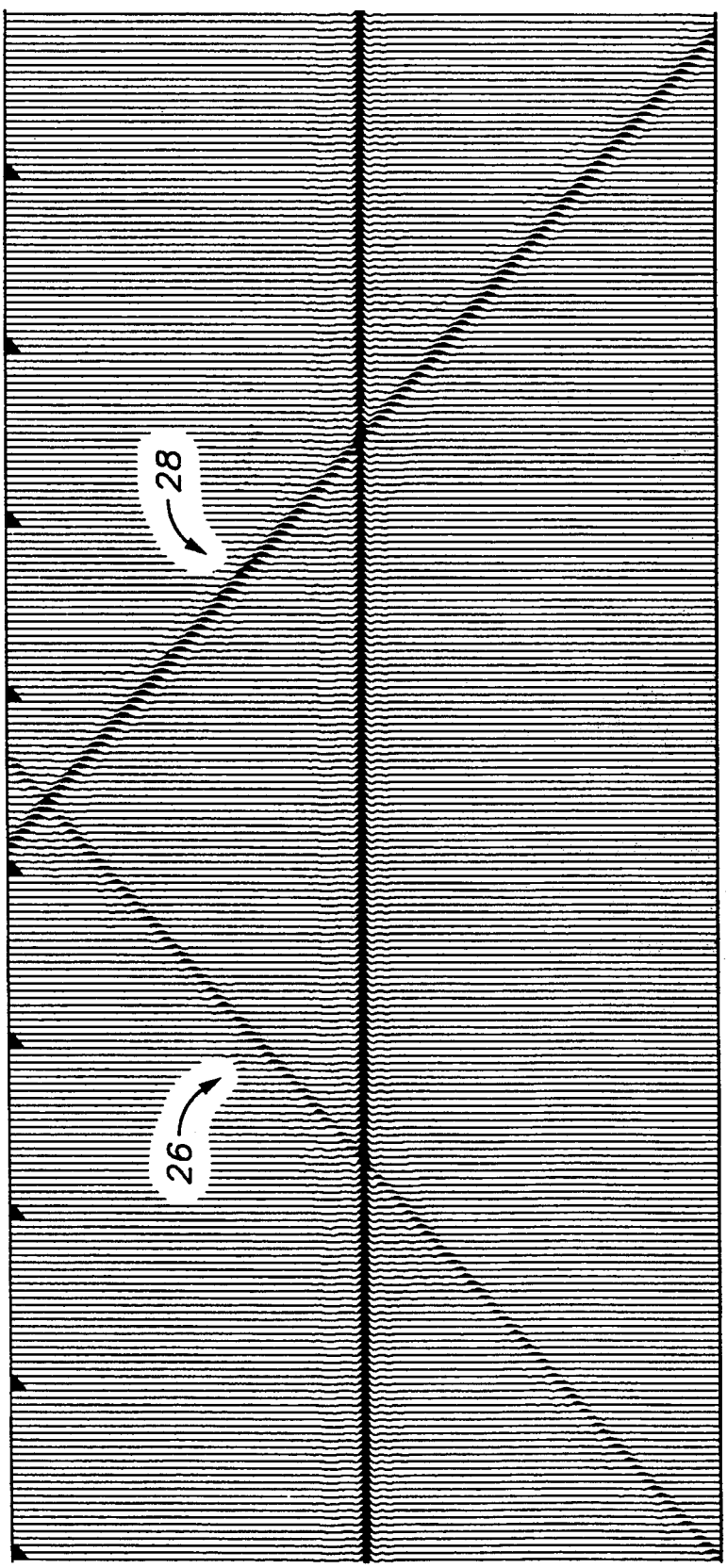
FIG. 3 shows the dip response with respect to the configuration of FIG. 2 for CMP line 7.
Figure 4:
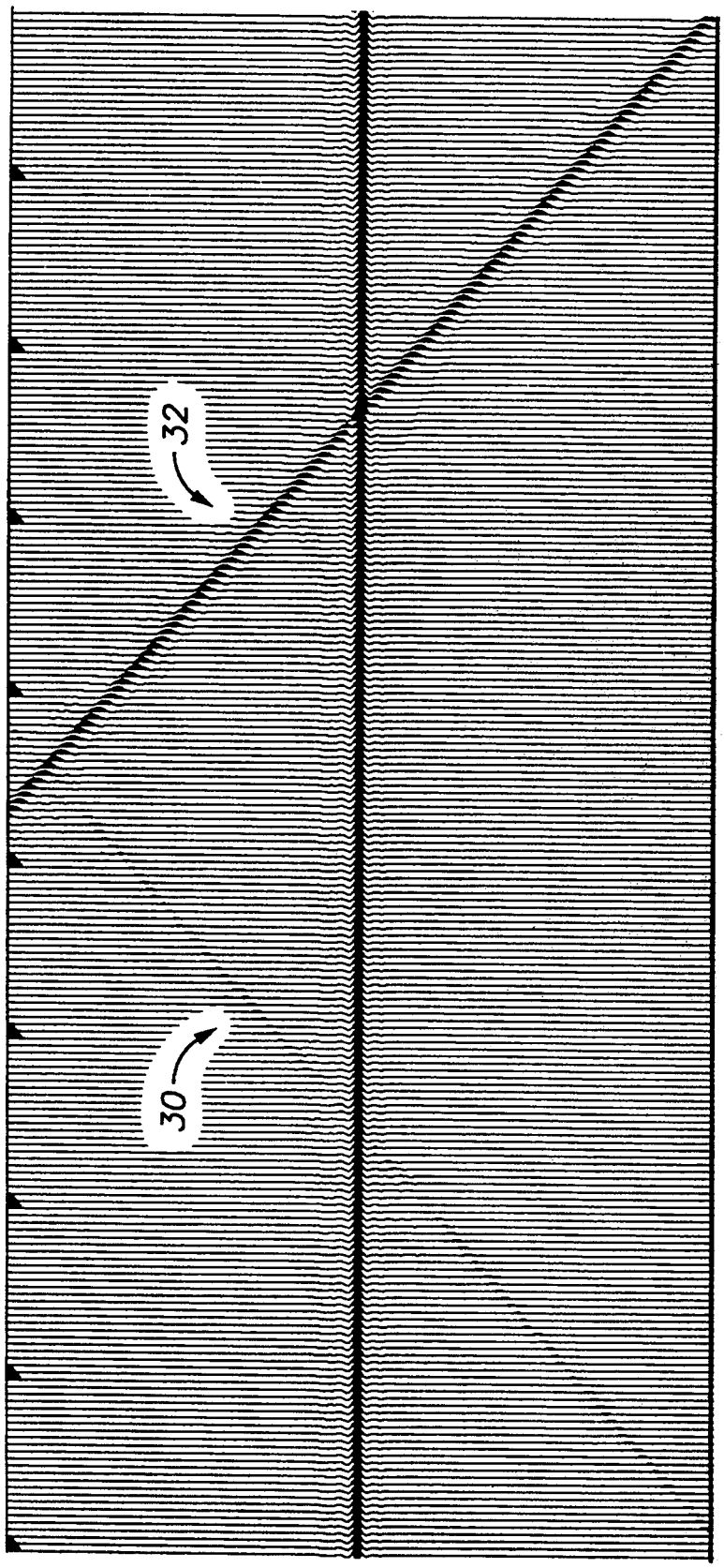
FIG. 4 shows the dip response with respect to the configuration of FIG. 2 for CMP line 8.

FIG. 3 shows the positive and negative dip distributions 26 and 28 for CMP line 7 after DMO equalization. A definite bias towards negative dips is exhibited but the bias does not appear to be excessive. FIG. 4 shows the positive and negative dip distributions 30 and 32 for CMP line 8, at the center of the swath. There is a decided bias towards negative dips; positive dips are virtually absent.

Figure 5:
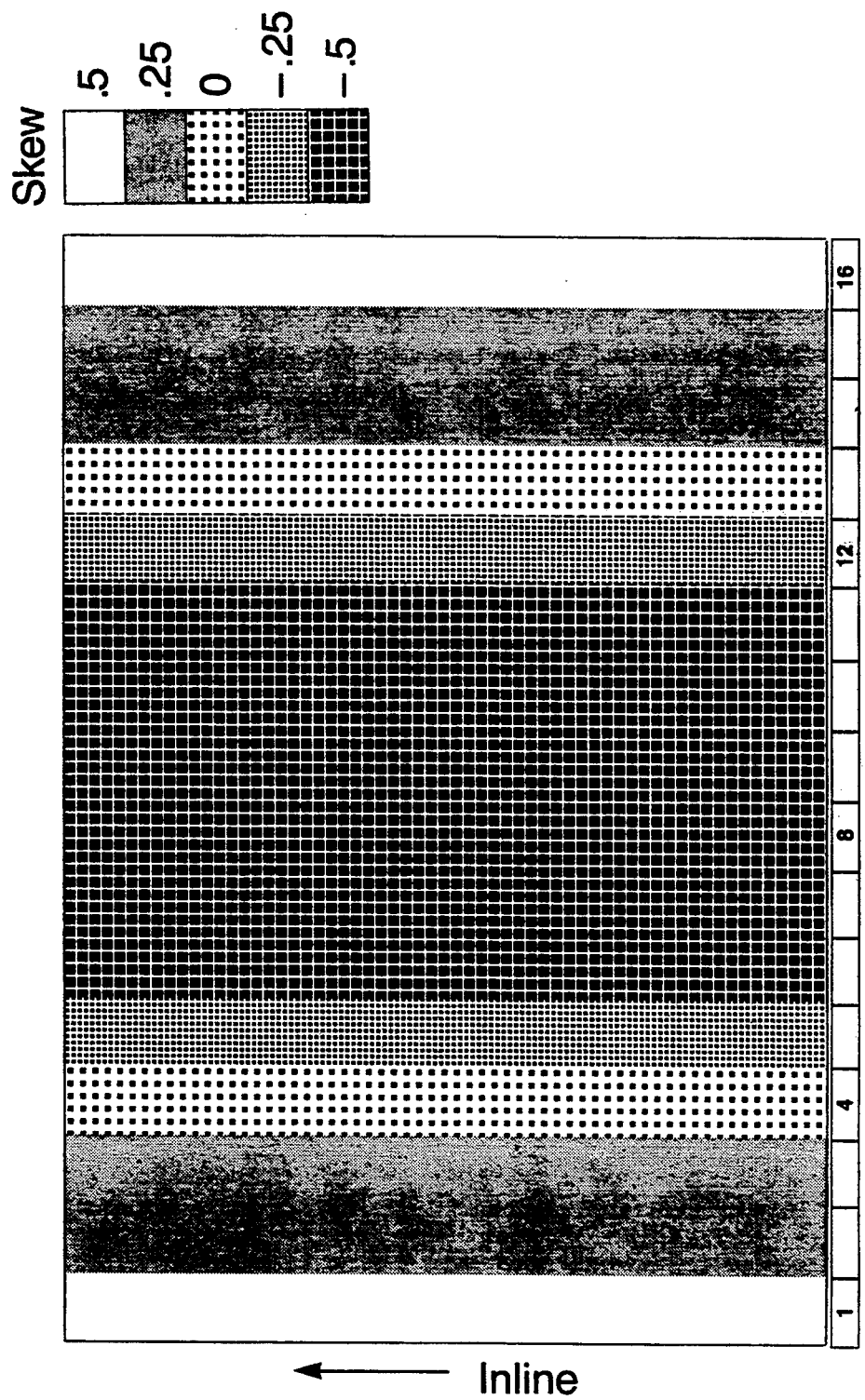
FIG. 5 depicts the skew in dip for the respective 16 CMP lines of FIG. 2.

FIG. 5 is the skew distribution for all of the 16 CMP lines of the swath. The ideal skew would be 0 but only CMP lines 4 and 13 have that happy characteristic.

CMP lines 7 and 8 are skewed to negative dips as noted for the previous two FIGS. 3 and 4.

Figure 6:
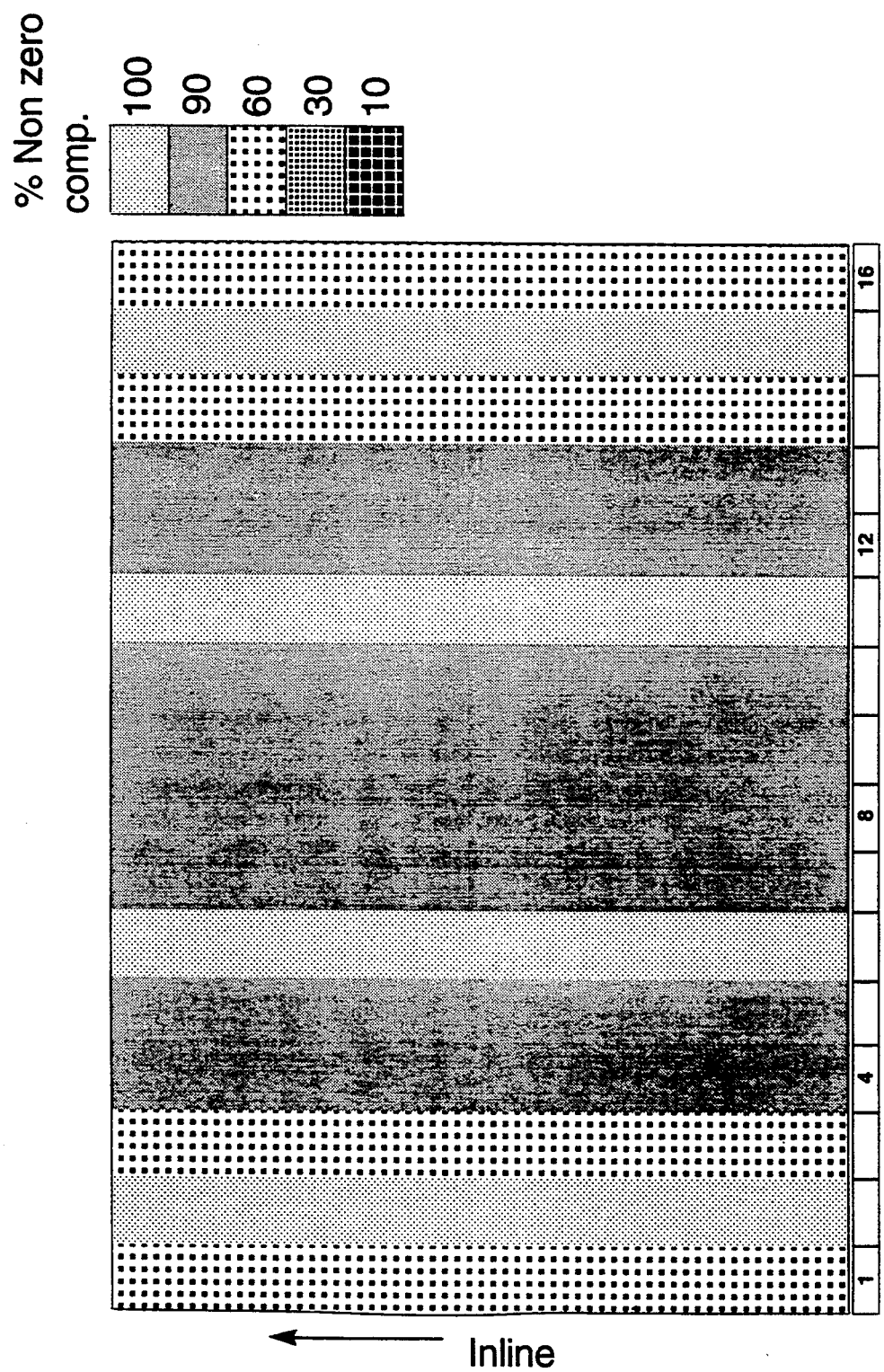
FIG. 6 shows the percentage of non zero positive dips seen by the 16 CMP lines.
Figure 7:
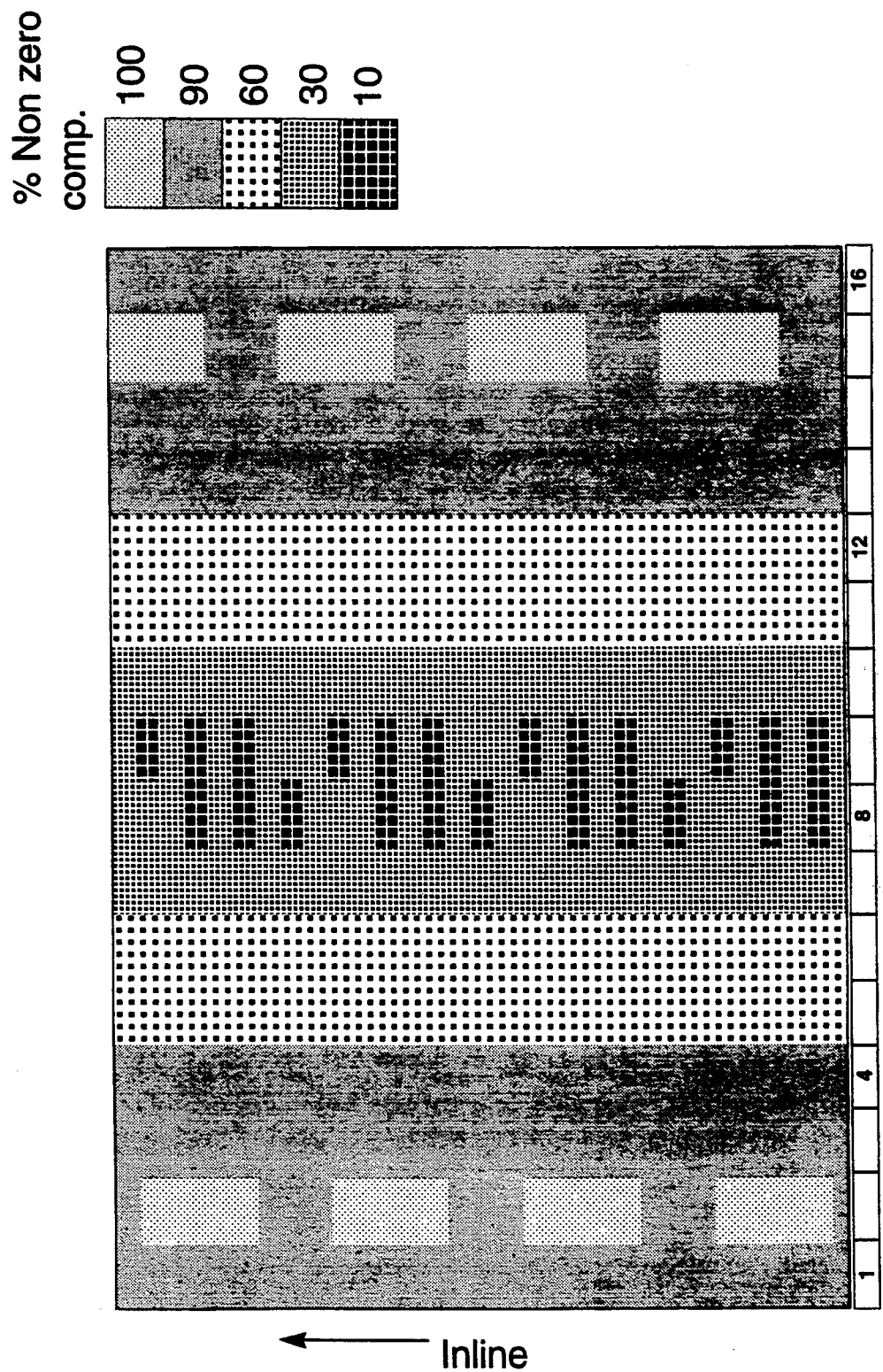
FIG. 7 illustrates the percentage of non zero negative dips seem by the respective CMP lines of FIG. 2.

FIG. 6 illustrates the percentage of non zero negative dips distributed across the respective, CMP lines 1-16. FIG. 7 represents the positive dip distribution for CMP lines 1-16. Note that line 7 indicates the presence of 30% positive dips while line 8 shows many shadow zones where the positive dip distribution is 10% or less which confirms the dip distribution shown in FIG. 4.

Figure 8:
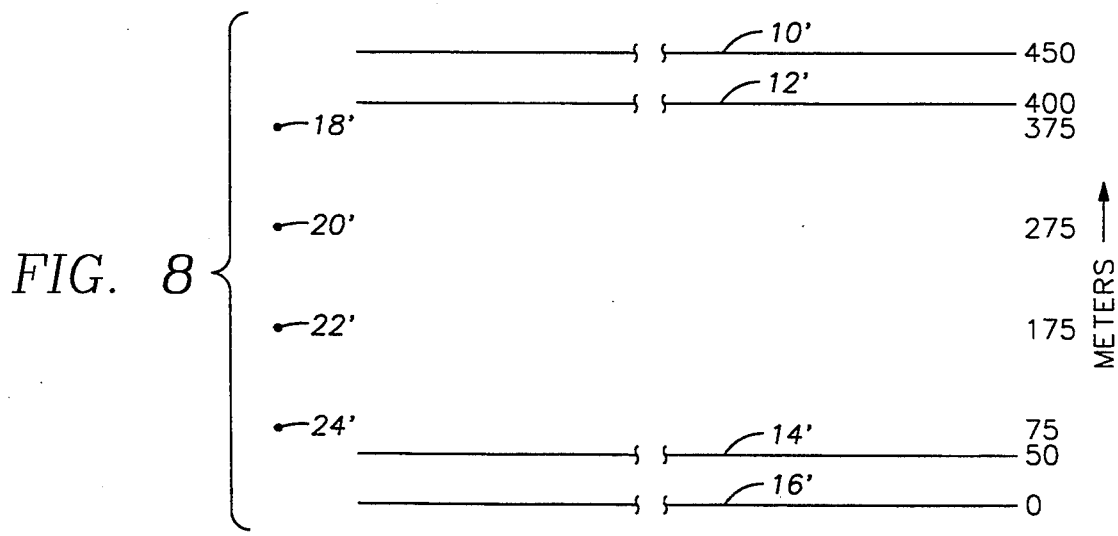
FIG. 8 illustrates perturbation of the configuration of FIG. 2 by placing the sources inboard of the receiver array.

The presence of the many shadow zones shown in FIG. 7 for positive dips urges one to perturb the initial array geometry of FIG. 2 in an attempt to create an improvement in the dip distributions. FIG. 8 represents such a perturbation wherein the acoustic sources 18'-24' are arranged inboard of the streamer cables 10'-16'. The spacing of sources and streamer cables is as shown.

Figure 9:
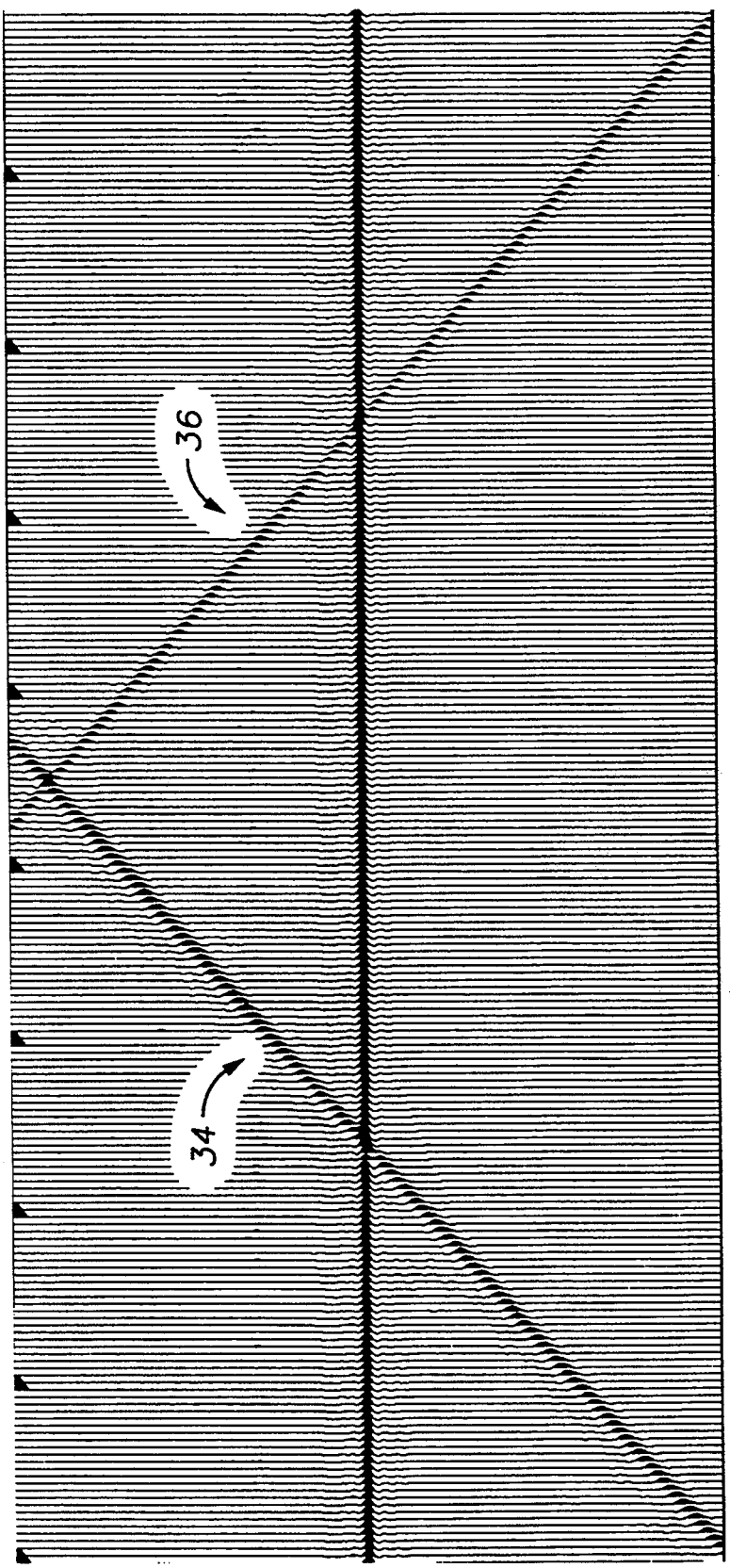
FIG. 9 shows the dip response of the array of FIG. 8 with respect to CMP line 7.
Figure 10:
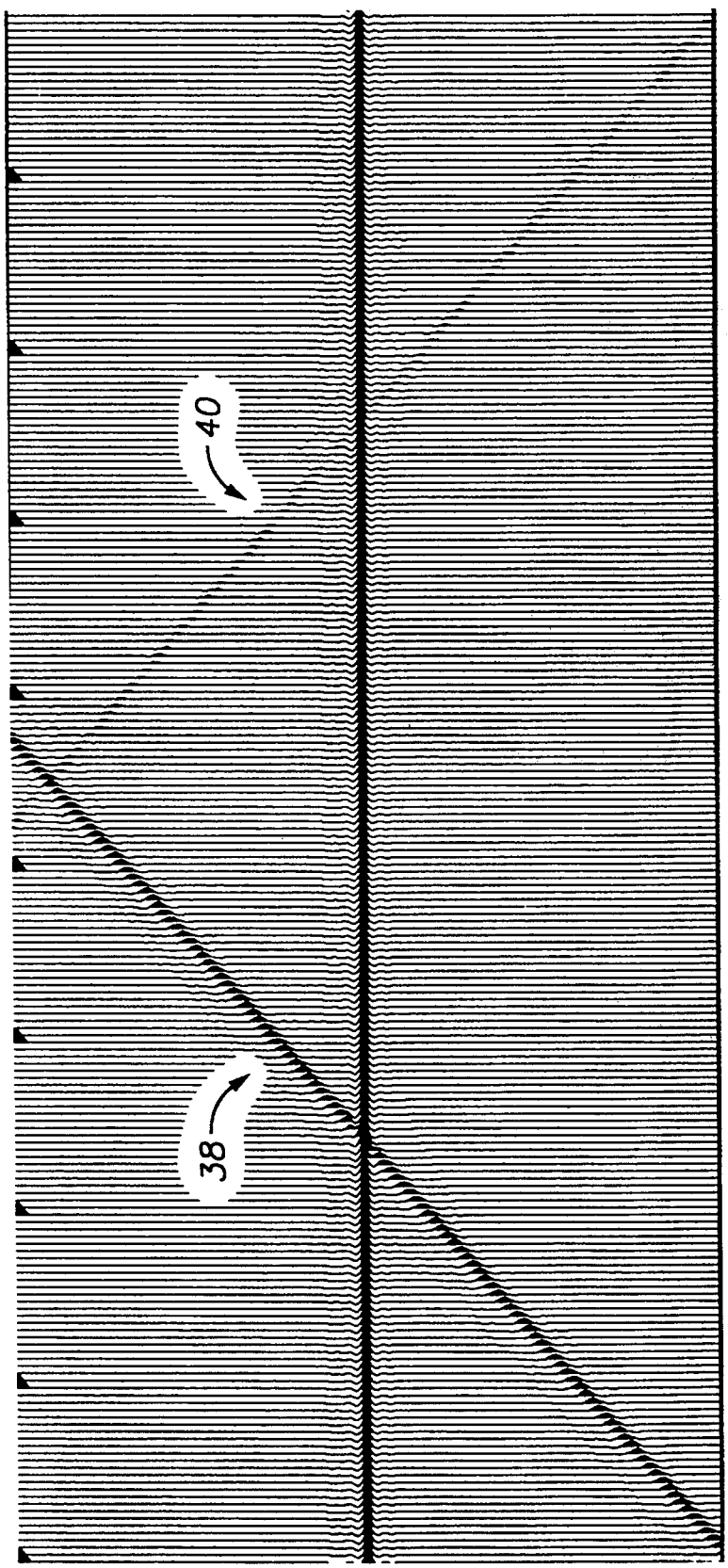
FIG. 10 is the dip response of the array of FIG. 8 with respect to CMP line 8.

FIG. 9 shows the dip distribution for line 7. Here, the positive dips 34 are emphasized with respect to negative dips 36. FIG. 10 exhibits the dip distribution for line 8. The dip distribution is strongly skewed towards positive dips 38 at the expense of negative dips 40. However, the relative attenuation of the negative dips 40 does not appear to be as severe as the positive dip attenuation of FIG. 4. Therefore, the reconfiguration of the seismic array has proven to be beneficial in this respect.

This disclosure teaches a method that is useful for pre-operational survey planning purposes. It is envisioned that this method will be employed as an integral part of the conduct of the actual survey operation so that the effect of changing environmental conditions can be evaluated in near real time to allow remedial action to be taken in a timely manner.

The method has been explained with a certain degree of specificity that is exemplary only and is in no way limited thereto.

Those skilled in the art will recognize variations in the method but that will fall within the scope and spirit of this invention which is limited only be the appended claims.

What is claimed is:

1. In a multichannel wavefield gathering operation, a method for optimizing the geometry of an array of acoustic sources and sampling stations, comprising:
   (a) selecting an initial geometry for the disposition of said array of acoustic sources and sampling stations;
   (b) propagating a wavefield from a source location;
   (c) spatially sampling said wavefield at a preselected plurality of discrete sampling stations distributed along a preselected azimuth to provide a raw wavefield input data gather;
   (d) applying a DMO equalization operator to said input data gather;
   (e) analyzing the DMO-equalized data input gather for undesired singularities; and
   (f) perturbing the physical configuration of the initial array geometry when an undesired singularity is observed during the course of said analysis.

2. The method as defined by claim 1, comprising:
   optimizing the physical array configuration by iteratively executing steps (a) through (f), using different source and receiver stations for each iteration.

3. The method as defined by claim 2, wherein the step of analyzing includes the sub steps of:
   (1) sampling the dips for every x along said preselected CMP azimuth over the range between h and -h, where h is one-half the source receiver offset, and binning the sampled dips to form dip weight distribution tables;
(2) forming selected statistics in skew and standard deviation from the dip weight distributions; and
(3) defining an undesired singularity as a preferential skew towards dips of a single polarity.

4. The method as defined by claim 2, comprising:
(1) forming dip weight tables;
(2) executing statistical analyses of said dip weight tables; and
(3) defining undesired singularities by analyses of said statistics.

5. The method as defined by claims 3 or 4, comprising:
optimizing said initial geometry by iteratively repeating steps (c) through (e)(3) and (f).

6. The method as defined by claim 5, comprising:
executing steps (a) through (e)(3) and (f) during the conduct of active survey operations in the presence of changing environmental field conditions.

* * * * *